(12) United States Patent
Matsuo et al.

(10) Patent No.: US 10,469,695 B2
(45) Date of Patent: Nov. 5, 2019

(54) IMAGE FORMING APPARATUS

(71) Applicant: SHARP KABUSHIKI KAISHA, Sakai, Osaka (JP)

(72) Inventors: Manabu Matsuo, Sakai (JP); Takaharu Motoyama, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 0 days.

(21) Appl. No.: 16/219,103

(22) Filed: Dec. 13, 2018

(65) Prior Publication Data

US 2019/0215414 A1 Jul. 11, 2019

(30) Foreign Application Priority Data

Jan. 5, 2018 (JP) .................. 2018-000649

(51) Int. Cl.
*G06K 15/12* (2006.01)
*H04N 1/10* (2006.01)
*G02B 26/10* (2006.01)
*H04N 1/195* (2006.01)

(52) U.S. Cl.
CPC ......... *H04N 1/1039* (2013.01); *G02B 26/105* (2013.01); *H04N 1/19552* (2013.01)

(58) Field of Classification Search
None
See application file for complete search history.

(56) References Cited

U.S. PATENT DOCUMENTS

2011/0134501 A1* 6/2011 Motoyama ........... G02B 26/127
359/216.1

FOREIGN PATENT DOCUMENTS

JP 2002-258198 A 9/2002
JP 2010-066402 A 3/2010

* cited by examiner

*Primary Examiner* — Moustapha Diaby
(74) *Attorney, Agent, or Firm* — ScienBiziP, P.C.

(57) ABSTRACT

An image forming apparatus including an optical scanning device that scans an object to be scanned with a beam in a main scanning direction includes a first rotation fulcrum unit and a second rotation fulcrum unit that are respectively provided in the optical scanning device on one side and on the other side in an orthogonal direction orthogonal to the main scanning direction. The first rotation fulcrum unit is provided outside a scanning area of the beam in the main scanning direction. The optical scanning device is provided rotatably around a virtual rotation axial line connecting the first rotation fulcrum unit and the second rotation fulcrum unit.

9 Claims, 18 Drawing Sheets

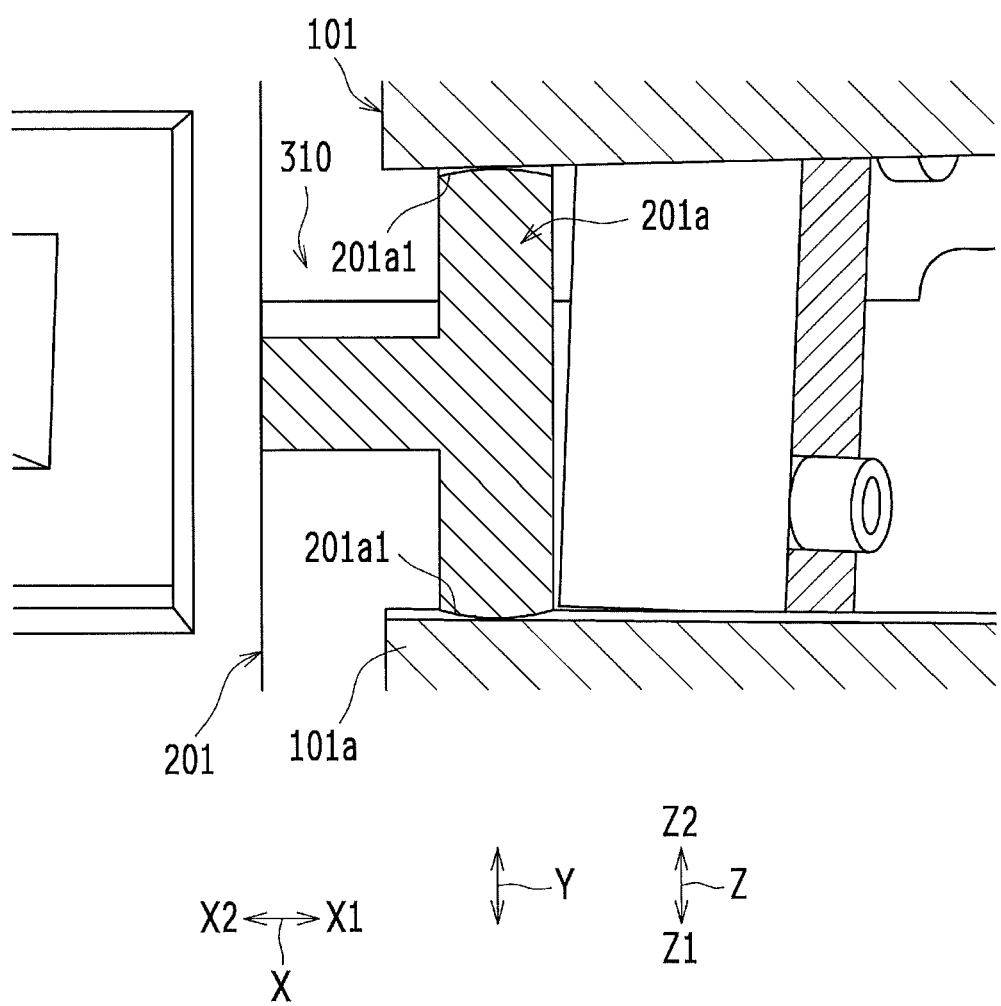

FIG. 13
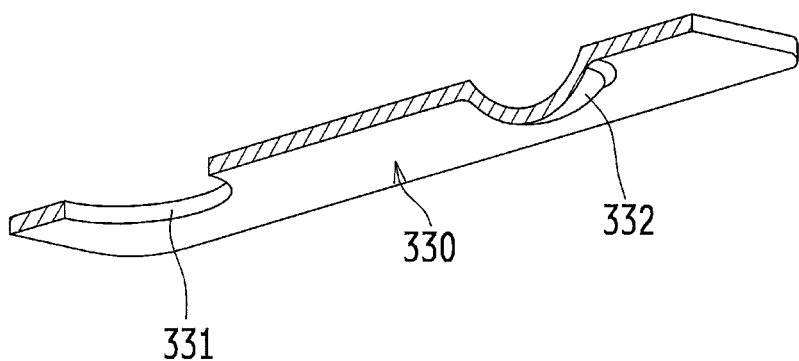
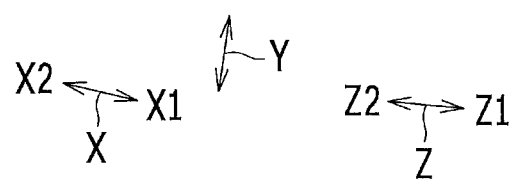

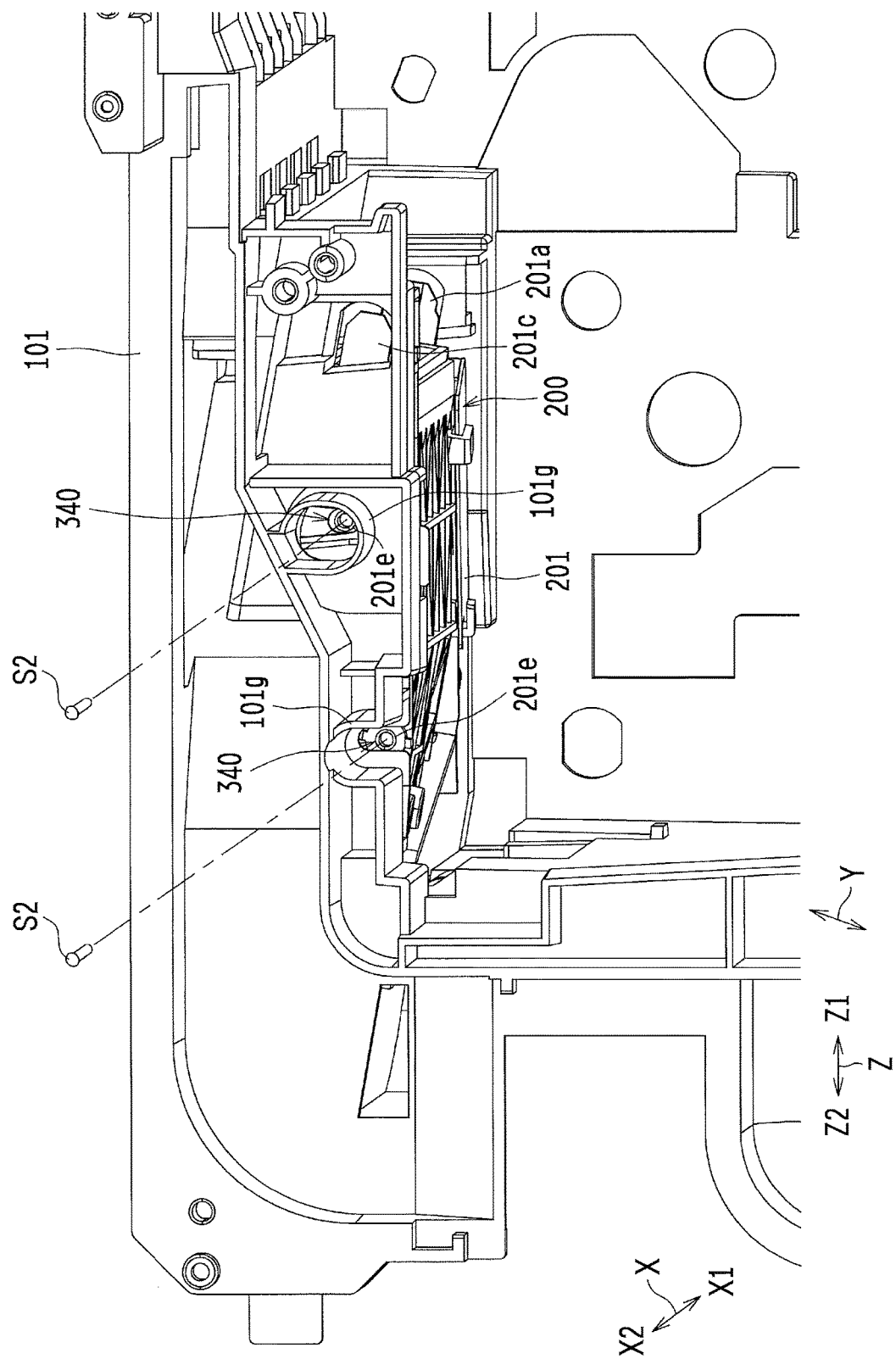

IMAGE FORMING APPARATUS

BACKGROUND

1. Field

The present disclosure relates to an image forming apparatus such as a copier, a multifunction peripheral, a printer, and a facsimile, and particularly to an image forming apparatus including an optical scanning device that scans an object to be scanned with a beam in a main scanning direction.

2. Description of the Related Art

As an image forming apparatus including an optical scanning device that scans an object to be scanned with a beam in a main scanning direction, there are an apparatus described in Japanese Unexamined Patent Application Publication No. 2002-258198 and an apparatuses described in Japanese Unexamined Patent Application Publication No. 2010-66402, for example.

That is, Japanese Unexamined Patent Application Publication No. 2002-256198 discloses a configuration in which rocking fulcrums of a housing of an optical scanning device are provided at two points on a straight line (virtual rotation axial line) that crosses obliquely with respect to a shaft core of an object to be scanned (scanning area) and an adjustment point is provided at one point on another straight line orthogonal to the straight line so that an attitude of the housing of the optical scanning device with respect to the object to be scanned in a torsion direction is adjusted at the adjustment point.

Japanese Unexamined Patent Application Publication No. 2010-66402 discloses a configuration in which one positioning axis is provided on a (scanning area) center part in an irradiation direction of a rotary polygon mirror in an optical scanning device, and when a vertex of a triangle is set on the positioning axis, two installation holes are provided at the other two points (on a virtual rotation axial line) of the triangle and positions for installing the two installation holes are set to be adjustable with the one positioning axis as a center.

However, in the configuration described in Japanese Unexamined Patent Application Publication No. 2002-258198 and the configuration described in Japanese Unexamined Patent Application Publication No. 2010-66402, the virtual rotation axial line of the optical scanning device passes through the center part of the scanning area in the main scanning direction. Then, a beam scanning trajectory that is a scanning trajectory of a beam output from the optical scanning device is inclined to both sides with respect to the main scanning direction with one point of the center part in the scanning area as a center. Thus, the beam scanning trajectory needs to be adjusted so as to be along the main scanning direction while three points of the one point of the center part in the scanning area in the main scanning direction and two points in both end parts are being confirmed. Accordingly, an adjustment operation for adjusting the beam scanning trajectory so as to be along the main scanning direction becomes complicated.

Then, the disclosure provides an image forming apparatus which includes an optical scanning device that scans an object to be, scanned with a beam in a main scanning direction and which is able to realize simplification of an adjustment operation for adjusting a scanning trajectory of the beam, which is output from the optical scanning device, so as to be along the main scanning direction.

SUMMARY

It is desirable to provide an image forming apparatus including an optical scanning device that scans an object to be scanned with a beam in a main scanning direction, and the image forming apparatus includes a first rotation fulcrum unit and a second rotation fulcrum unit that are respectively provided in the optical scanning device on one side and on the other side in an orthogonal direction orthogonal to the main scanning direction, in which the first rotation fulcrum unit is provided outside a scanning area of the beam in the main scanning direction, and the optical scanning device is provided rotatably around a virtual rotation axial line connecting the first rotation fulcrum unit and the second rotation fulcrum unit.

BRIEF DESCRIPTION OF THE DRAWINGS

FIG. 9C is a vertical sectional view taken along a IXC-IXC line illustrated in FIG. 9A;

FIG. 13 is a perspective sectional view of an elastic member in the optical scanning device, as seen obliquely upward from the front surface side;

FIG. 17 is a perspective view of the body frame of the image forming apparatus, as seen obliquely upward from the front surface side by the optical scanning device.

DESCRIPTION OF THE EMBODIMENTS

Hereinafter, embodiments according to the disclosure will be described with reference to drawings. In the following description, the same components will be given the same reference signs. Also, the components with the same reference signs have the same names and functions. Accordingly, detailed description thereof will not be repeated.

[Image Forming Apparatus]

Figure 1:
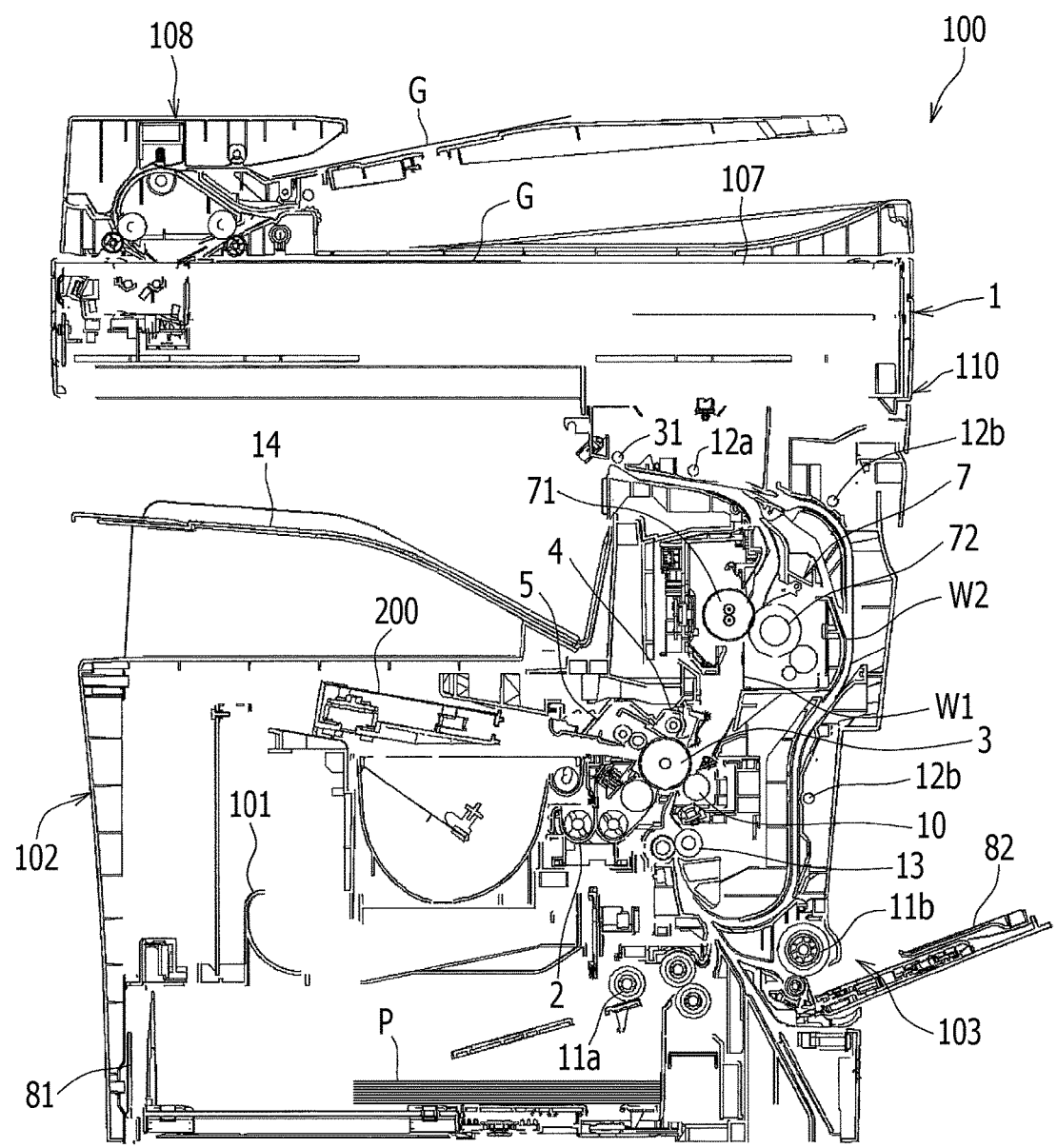
FIG. 1 is a schematic sectional view of an image forming apparatus according to an embodiment of the disclosure, as seen from a front surface.
Figure 2:
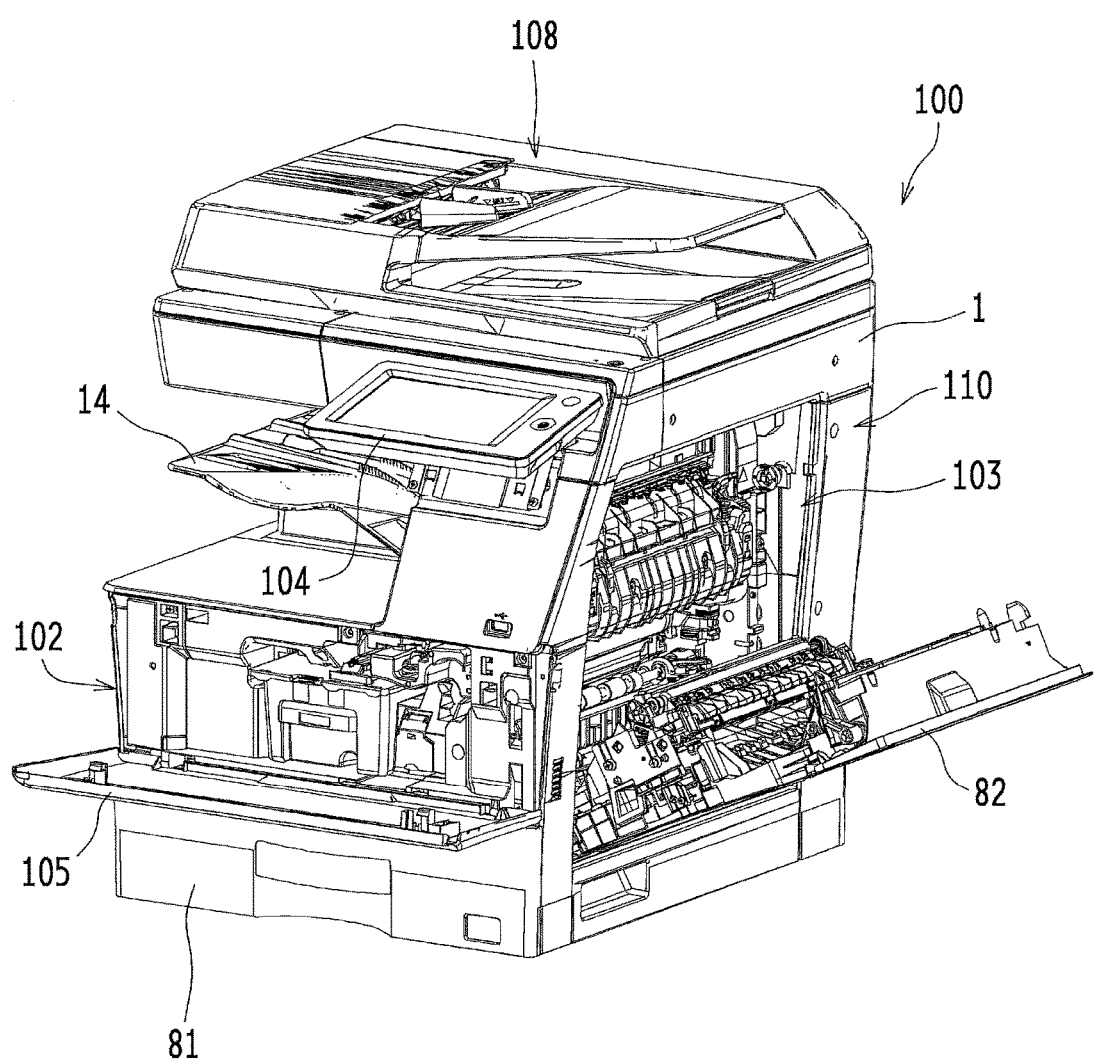
FIG. 2 is a schematic perspective view of an image forming apparatus body illustrated in FIG. 1, as seen obliquely left downward.

FIG. 1 is a schematic sectional view of an image forming apparatus 100 according to the embodiments of the disclosure, as seen from a front surface. FIG. 2 is a schematic perspective view of an image forming apparatus body 110 illustrated in FIG. 1, as seen obliquely left downward. FIG. 2 illustrates a state where an open/close cover 105 and a manual sheet feeding tray 82 are opened. The image forming apparatus 100 according to the present embodiment is a monochrome image forming apparatus. The image forming apparatus 100 performs image forming processing in accordance with image data read by an image reading device 1 or image data transmitted from outside. Note that, the image forming apparatus 100 may be a color image forming apparatus that forms a multicolor or monochromatic image on a sheet P.

A document feeding device 108 and the image forming apparatus body 110 are included in the image forming apparatus 100. An image forming section 102 and a sheet conveyance system 103 are included in the image forming apparatus body 110.

The image forming section 102 includes an optical scanning device 200 (specifically, an optical scanning unit), a development unit 2, a photosensitive drum 3 that serves as an electrostatic latent image carrier, a cleaning unit 4, a charging device 5, and a fixing unit 7. These components are supported by a body frame 101 of the image forming apparatus 100. The image forming section 102 is covered with the open/close cover 105 in an openable/closable manner on a front surface side of the image forming apparatus 100. The sheet conveyance system 103 includes a sheet feeding tray 81, the manual sheet feeding tray 82, a discharge roller 31, and a discharge tray 14. An operation panel 104 is provided on a front surface side of the image reading device 1.

The image reading device 1 which reads an image of a document G is provided above the image forming apparatus body 110. The image reading device 1 includes a document placing table 107 on which the document G is placed. The document placing table 107 is made of transparent tempered glass and has a quadrilateral shape. Additionally, the document feeding device 108 is provided on an upper side of the document placing table 107. In the image forming apparatus 100, an image of the document G read by the image reading device 1 is transmitted to the image forming apparatus body 110 as image data and the image is recorded on a sheet P.

A sheet conveyance path W1 is provided in the image forming apparatus body 110. The sheet feeding tray 8a or the manual sheet feeding tray 82 supplies the sheet P to the sheet conveyance path W1. The sheet conveyance path W1 guides the sheet P to the discharge tray 14 via a transfer roller 10 and the fixing unit 7. The fixing unit 7 heats and fixes, onto the sheet P, a toner image formed on the sheet P. Pickup rollers 11a and 11b, a conveyance roller 12a, a resist roller 13, the transfer roller 10, a heat roller 71 and a pressure roller 72 in the fixing unit 7, and the discharge roller 31 are disposed near the sheet conveyance path W1.

In the image forming apparatus 100, the sheet P supplied from the sheet feeding tray 81 or the manual sheet feeding tray 82 is conveyed up to the resist roller 13. Next, the sheet P is conveyed to the transfer roller 10 by the resist roller 13 at a timing at which the sheet P is matched with a toner image on the photosensitive drum 3. The toner image on the photosensitive drum 3 is transferred onto the sheet P by the transfer roller 10. Then, the sheet P passes through the heat roller 71 and the pressure roller 72 in the fixing unit 7 and is discharged on the discharge tray 14 via the conveyance roller 12a and the discharge roller 31. In a case where image formation is performed on a rear surface of the sheet P besides a front surface thereof, the sheet P is conveyed in a reverse direction from the discharge roller 31 to a reverse sheet conveyance path W2. The sheet P is guided again to the resist roller 13 via reverse conveyance rollers 12b to 12b so that the sheet P is reversed. Then, the sheet P is discharged toward the discharge tray 14 after a toner image is formed and fixed on the rear surface, similarly to the front surface.

[Optical Scanning Device]

Figure 3:
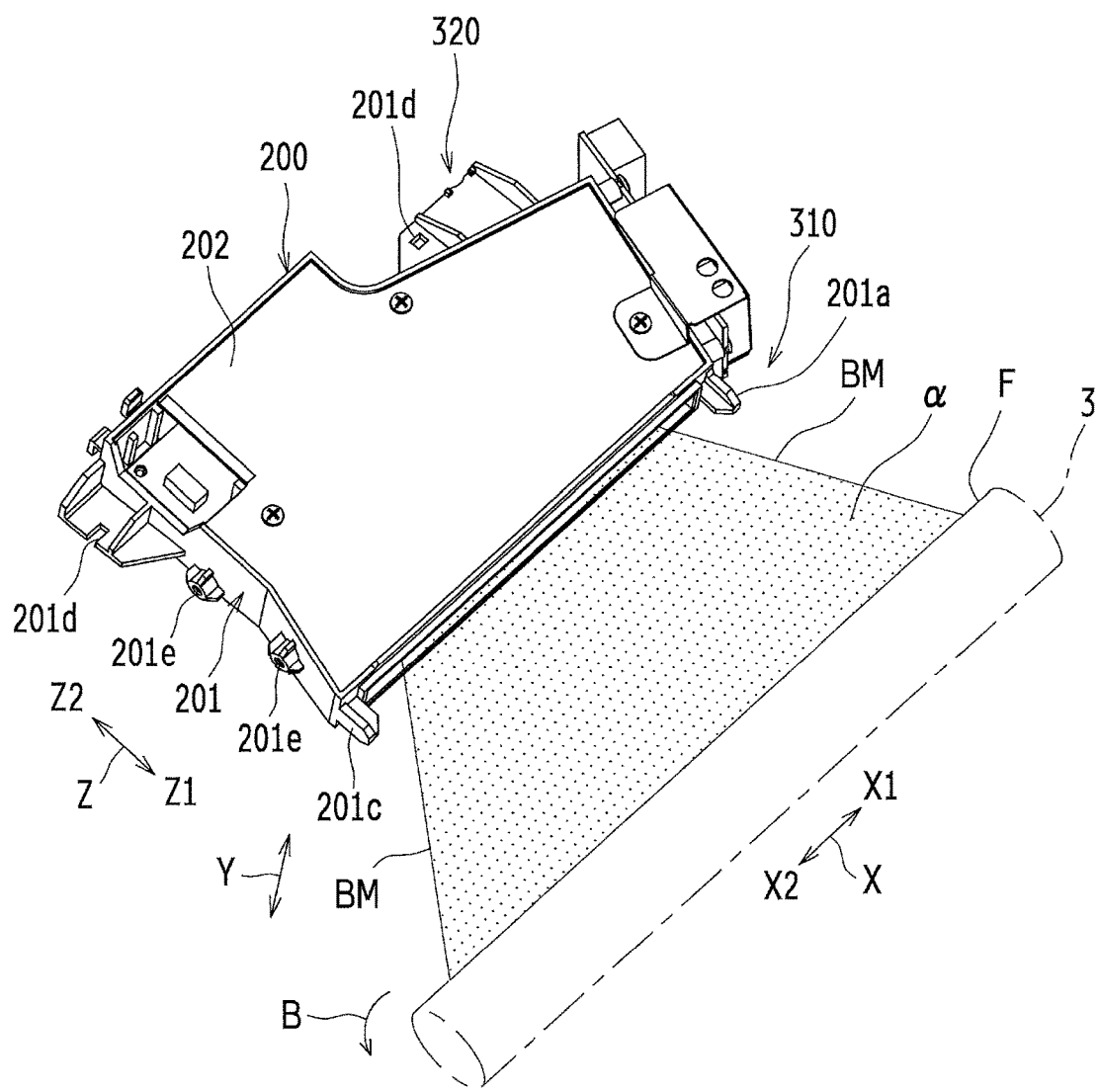
FIG. 3 is a perspective view of an optical scanning device and an object to be scanned, as seen obliquely downward from a front surface side.
Figure 4:
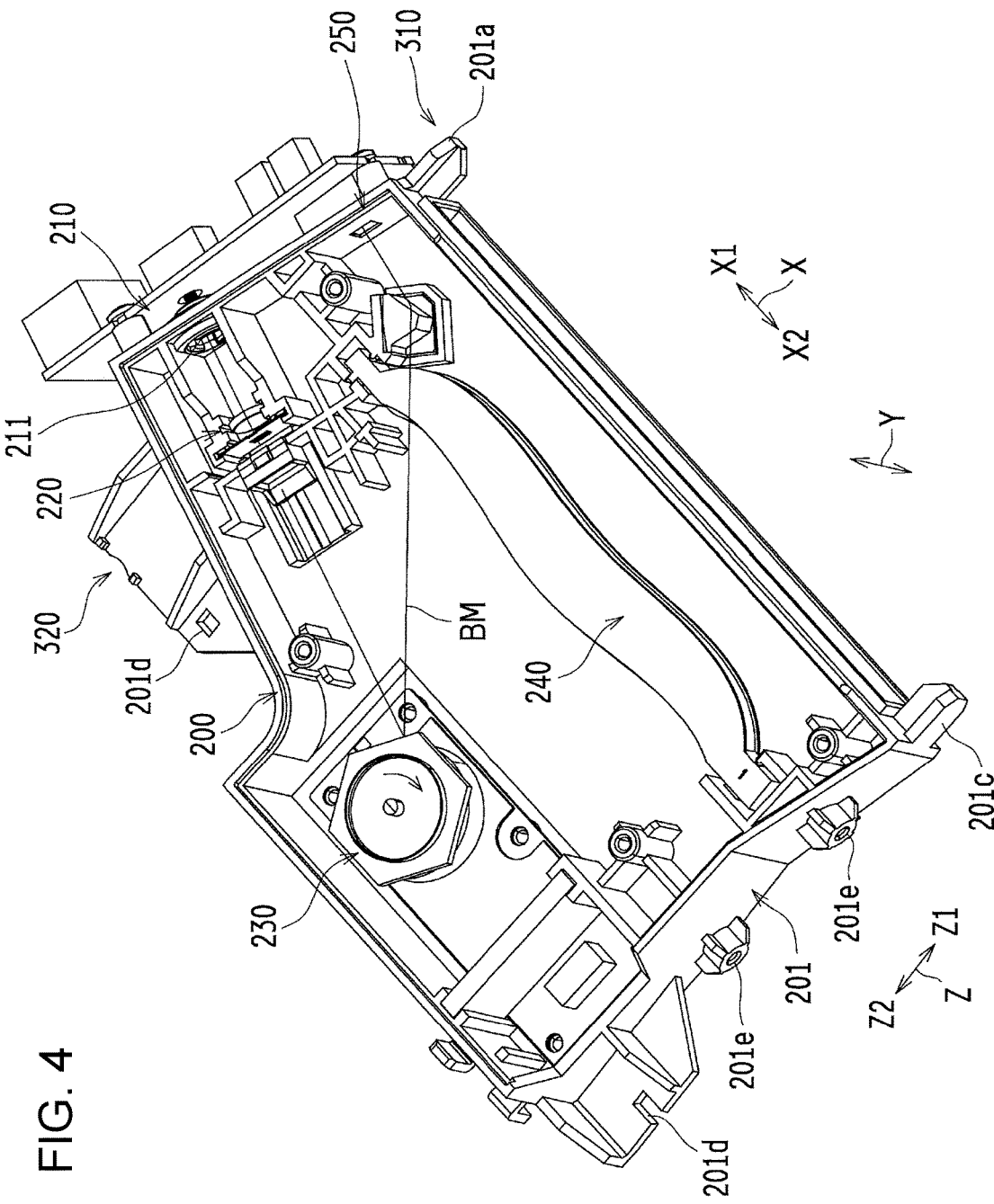
FIG. 4 is a perspective view illustrating a state where an upper lid of the optical scanning device is removed.

FIG. 3 is a perspective view of the optical scanning device 200 and an object to be scanned, as seen obliquely downward from the front surface side. FIG. 4 is a perspective view illustrating a state where an upper lid 202 of the optical scanning device 200 is removed. Note that, in the figures, a reference sign X represents a main scanning direction (depth direction in this example), and reference signs X1 and X2 respectively represent one side (back surface side) and the other side (front surface side). A reference sign Y represents a sub scanning direction (up-and-down direction or vertical direction in this example) orthogonal to the main scanning direction X. A reference sign Z represents an orthogonal direction (right-and-left direction as seen from the front surface in this example) orthogonal to both of the main scanning direction X and the sub scanning direction Y, and reference signs Z1 and Z2 respectively represent one side (right side as seen from the front surface) and the other side (left side as seen from the front surface).

The optical scanning device 200 includes a light source unit 210, an incident optical system 220, a deflector 230 (polygon mirror), an outgoing optical system 240, and a detection unit. The light source unit 210 includes a light source 211. The light source 211 outputs a beam BM. The incident optical system 220 is disposed between the light source unit 210 and the deflector 230 on an optical path of the beam BM. The incident optical system 220 causes the beam BM output from the light source unit 210 to be incident on the deflector 230. The deflector 230 performs deflection scanning in the main scanning direction X with the beam BM made incident from the light source unit 210 via the incident optical system 220. The outgoing optical system 240 is disposed between the deflector 230 and a surface to be scanned F (surface of the photosensitive drum 3 in this example) of an object to be scanned on the optical path of the beam BM. The outgoing optical system 240 irradiates the surface to be scanned F with the beam BM output from the deflector 230. The detection unit 250 detects the beam BM output from the deflector 230. The light source unit 210, the incident optical system 220, the deflector 230, the outgoing optical system 240, and the detection unit 250 are accommodated in a housing 201.

In the optical scanning device 200, the beam DM output from the light source unit 210 is caused to be incident on the deflector 230 via the incident optical system 220, the deflector 230 performs deflection scanning in the main scanning direction X with the beam BM, and image information is written on the surface to be scanned F, which is the surface of the photosensitive drum 3, via the outgoing optical system 240 while the detection unit 250 performs detection. Note that, the surface to be scanned F is regularly scanned with the beam BM in the main scanning direction X, but the photosensitive drum 3 rotates in a rotation direction 5 (refer to FIG. 3), so that the scanning is able to be performed on the photosensitive drum 3 also in the sub scanning direction Y.

First Embodiment

Figure 5:
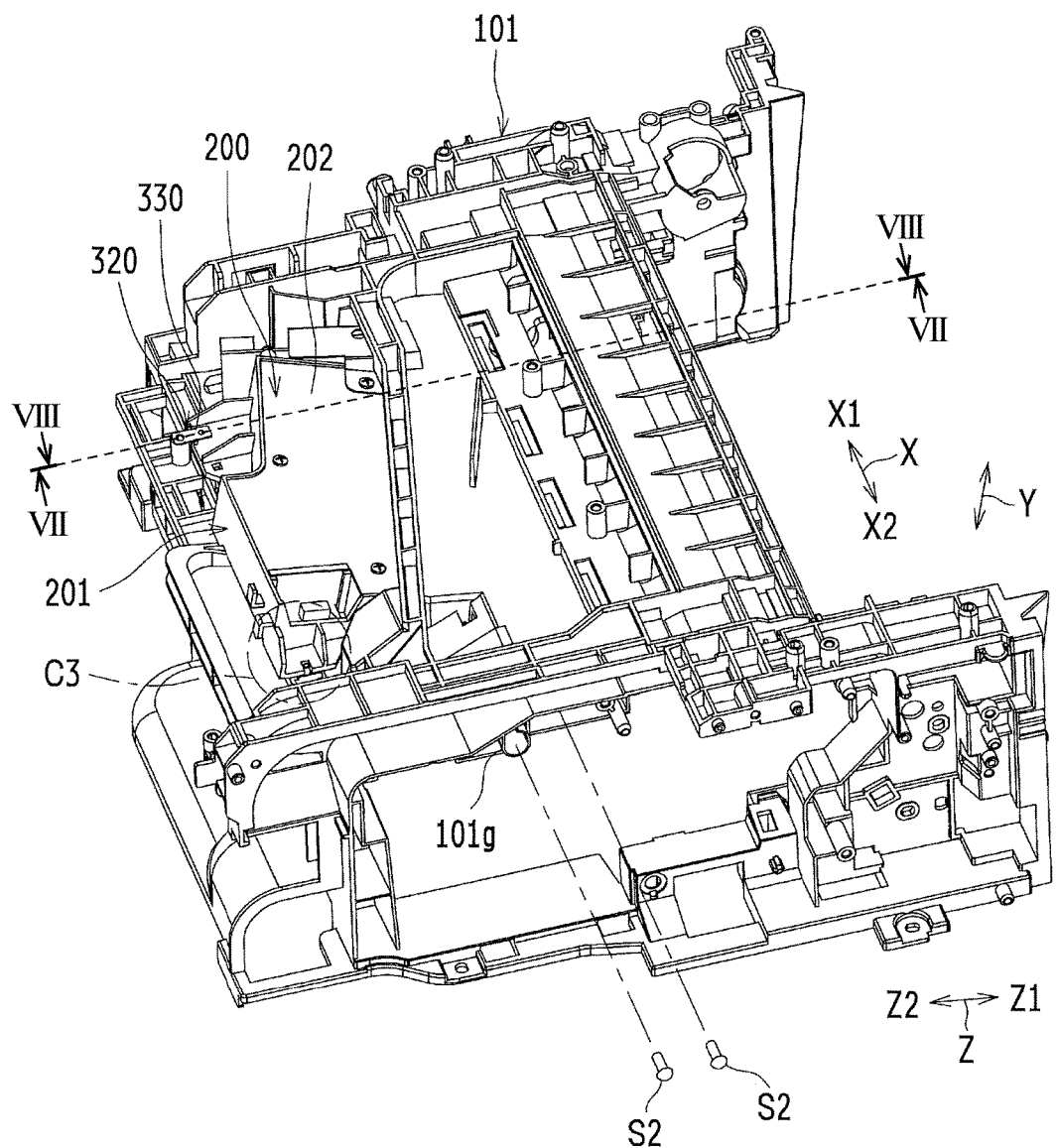
FIG. 5 is a perspective view illustrating a state where the optical scanning device is provided in a body frame of the image forming apparatus, as seen obliquely downward from the front surface side.
Figure 6:
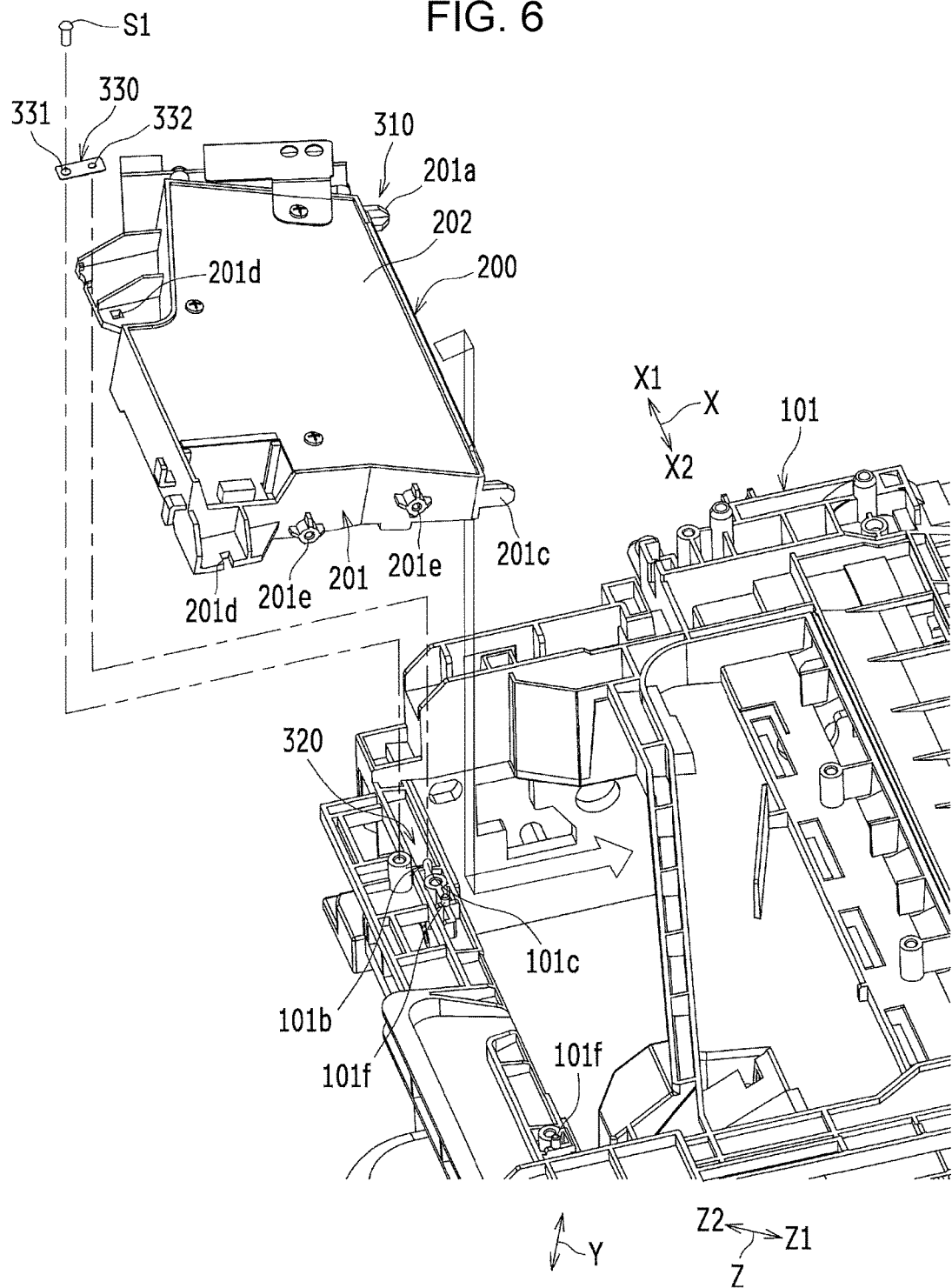
FIG. 6 is an exploded perspective view of the optical scanning device and the body frame which are illustrated in FIG. 5.
Figure 7:
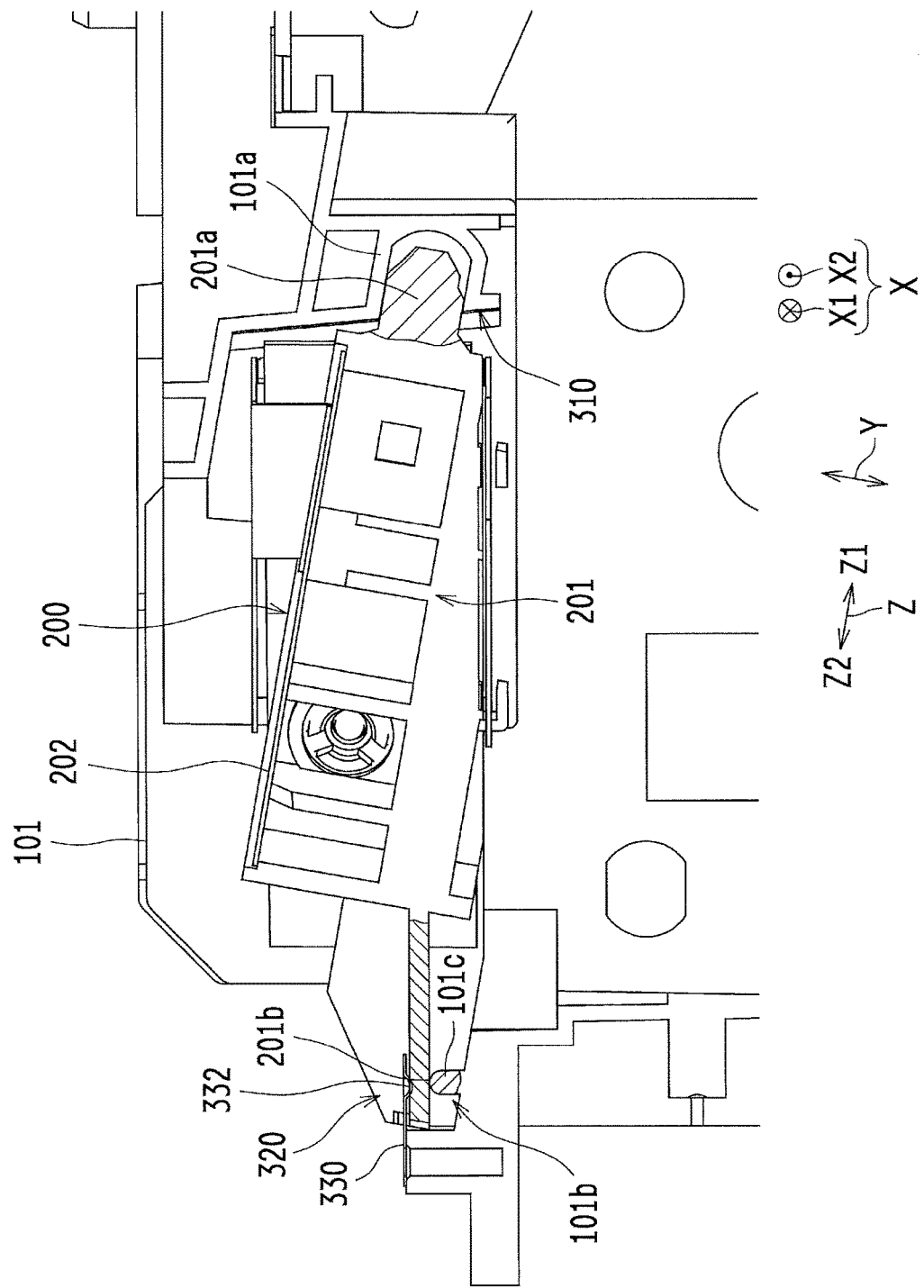
FIG. 7 is a sectional view taken along a VII-VII line illustrated in FIG. 3 as seen from the front surface in a direction of VII.
Figure 8:
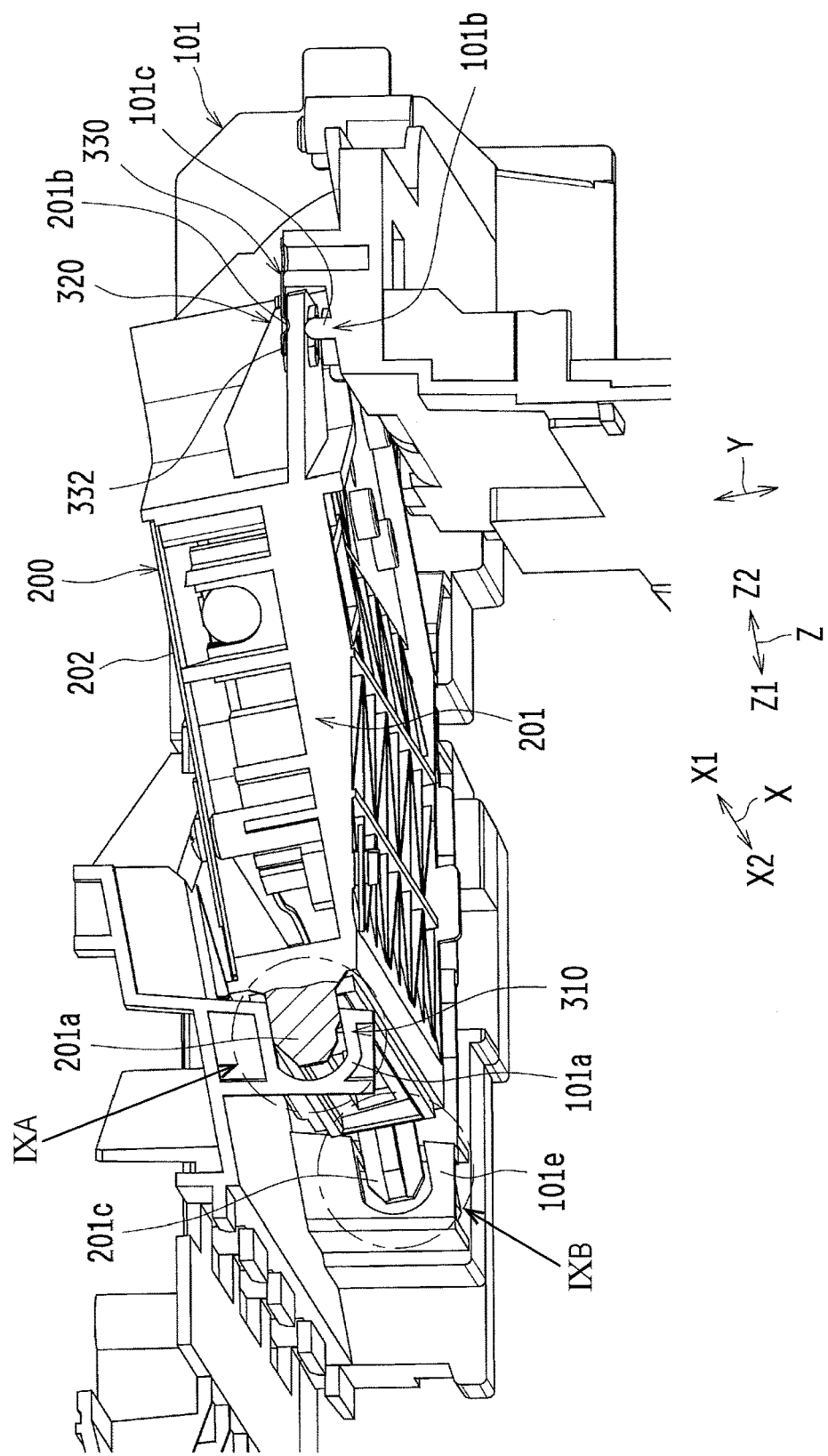
FIG. 8 is a perspective sectional view taken along an line illustrated in FIG. 5, as seen obliquely upward in a direction of VIII.

FIG. 5 is a perspective view illustrating a state where the optical scanning device 200 is provided in the body frame 101 of the image forming apparatus 100, as seen obliquely downward from the front surface side. FIG. 6 is an exploded perspective view of the optical scanning device 200 and the body frame 101 which are illustrated in FIG. 5 FIG. 7 is a sectional view taken along a VII-VII line illustrated in FIG. 5, as seen from the front surface in a direction of VII. FIG. 8 is a perspective sectional stew taken along an VIII-VIII line illustrated in FIG. 5, as seen obliquely upward in a direction of VIII.

Figure 9A:
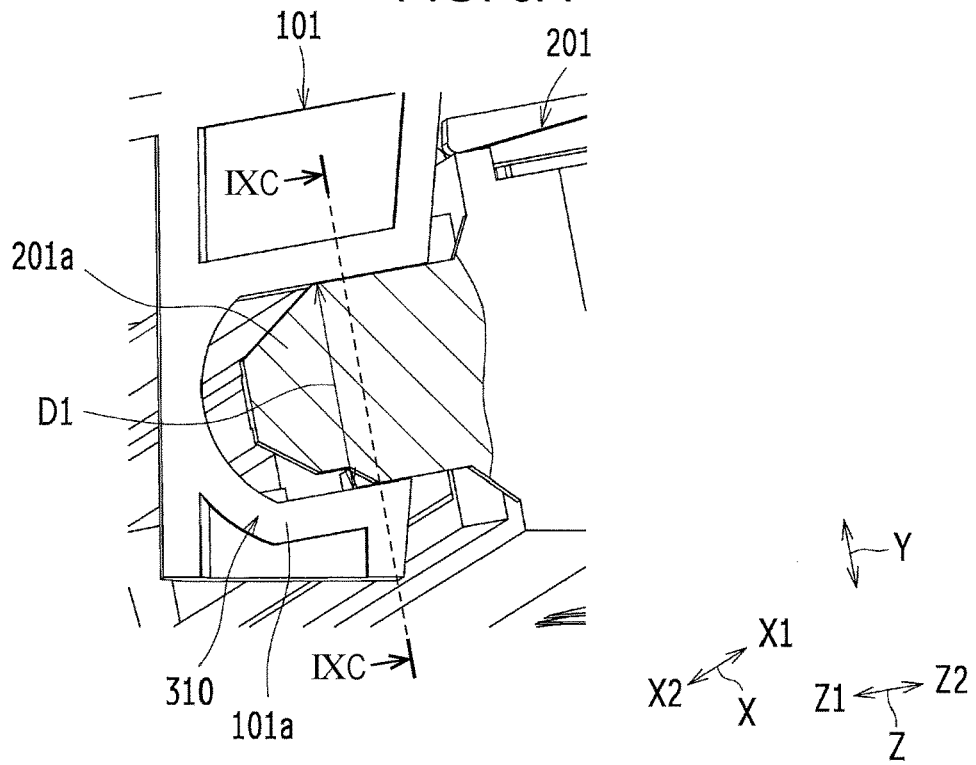
FIG. 9A is an enlarged perspective view of a part of a supported portion and a supporting portion which are illustrated in FIG. 8.

FIG. 9A is an enlarged perspective view of a part IXA of a supported portion 201a and a supporting portion 101a which are illustrated in FIG. 8. FIG. 95 is an enlarged perspective view of a part IXB of a first regulated portion 201c and a first regulating portion 101e illustrated in FIG. 8. FIG. 9C is a vertical sectional view taken along a IXC-IXC line illustrated in FIG. 9A.

Figure 10:
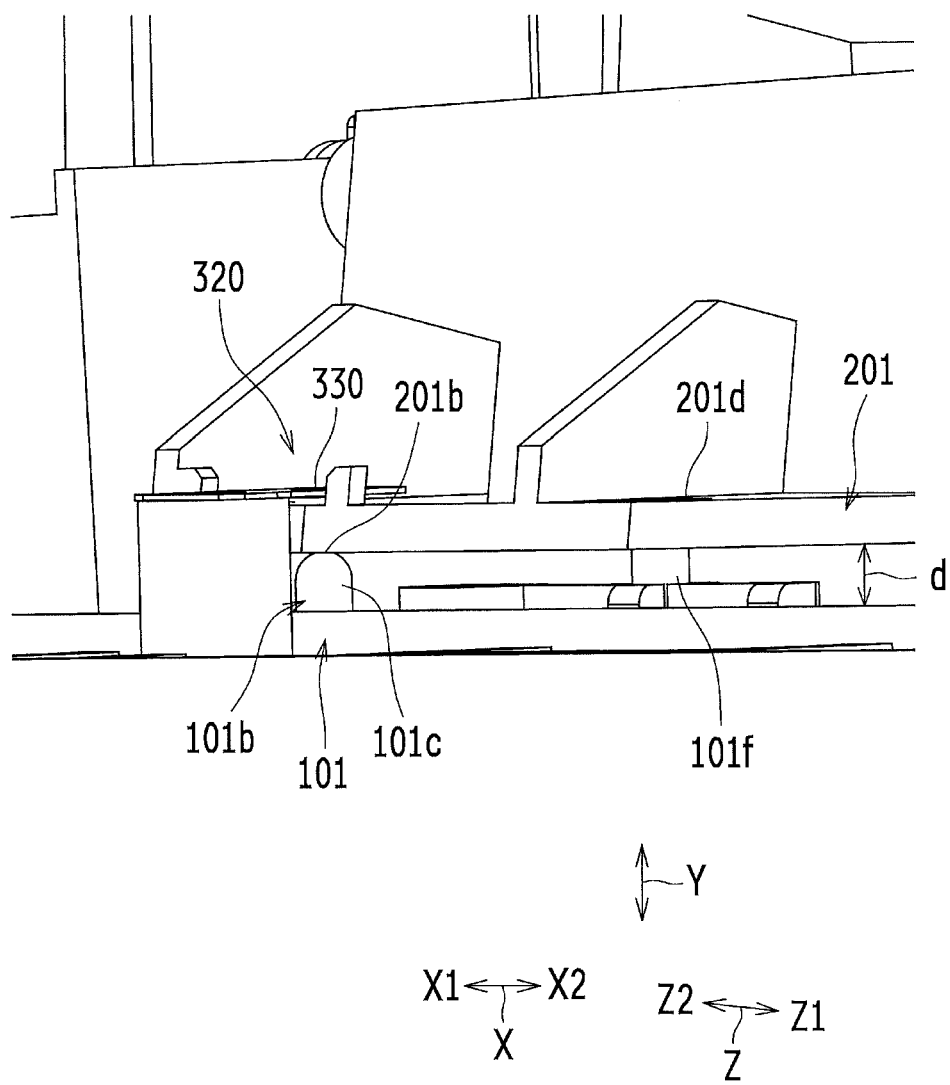
FIG. 10 is a perspective view illustrating that a gap is provided between the body frame and a housing in a second rotation fulcrum unit.
Figure 11:
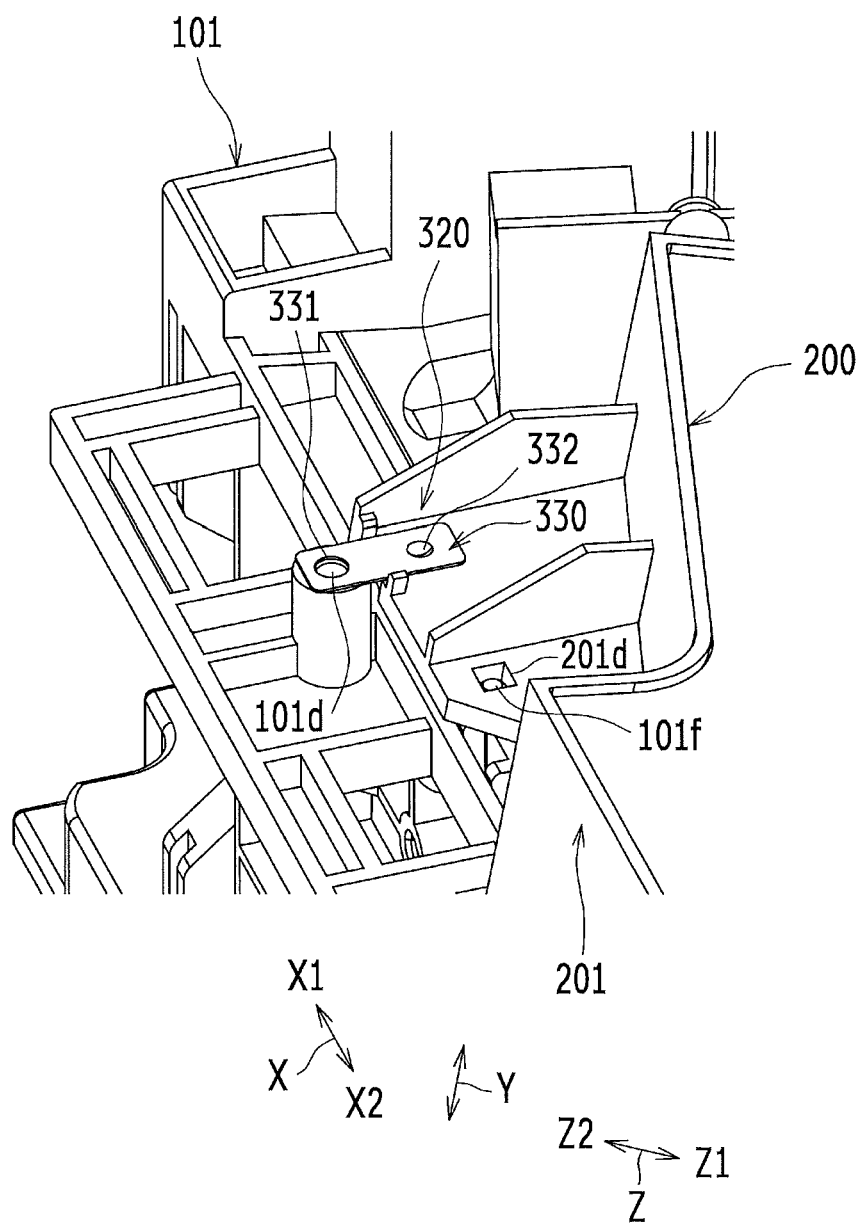
FIG. 11 is a perspective view of the second rotation fulcrum unit as seen obliquely downward from the front surface side.
Figure 12:
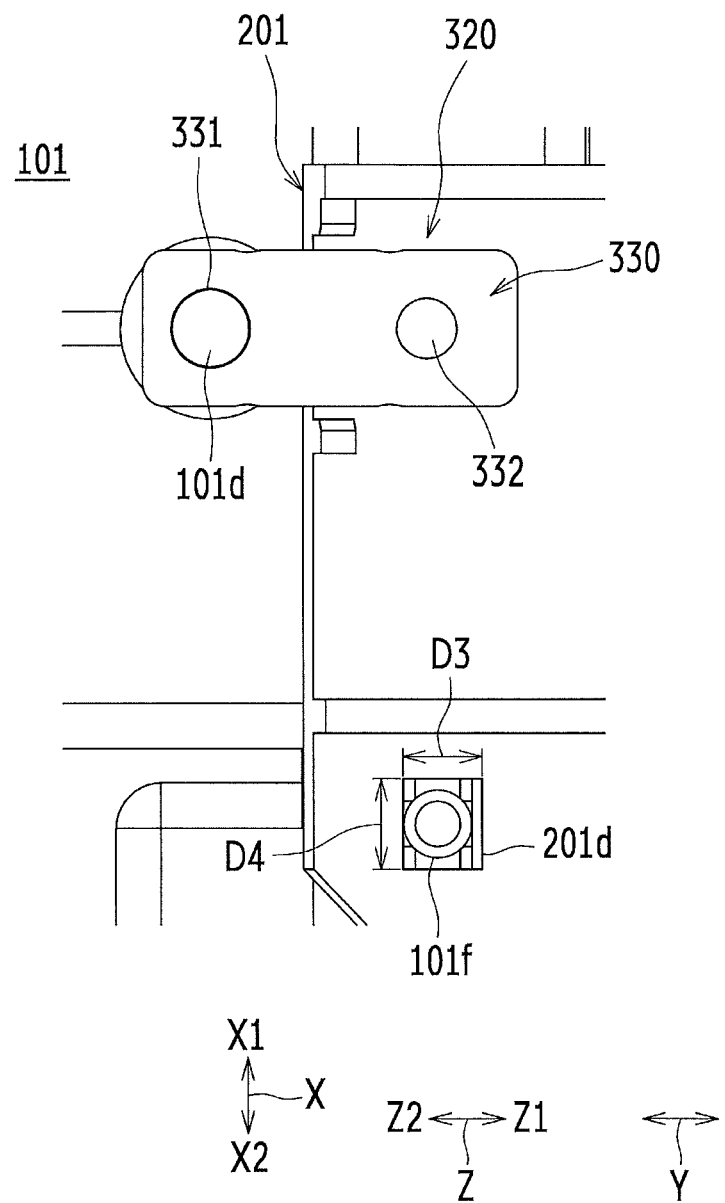
FIG. 12 is a top view of the second rotation fulcrum unit.
Figure 14:
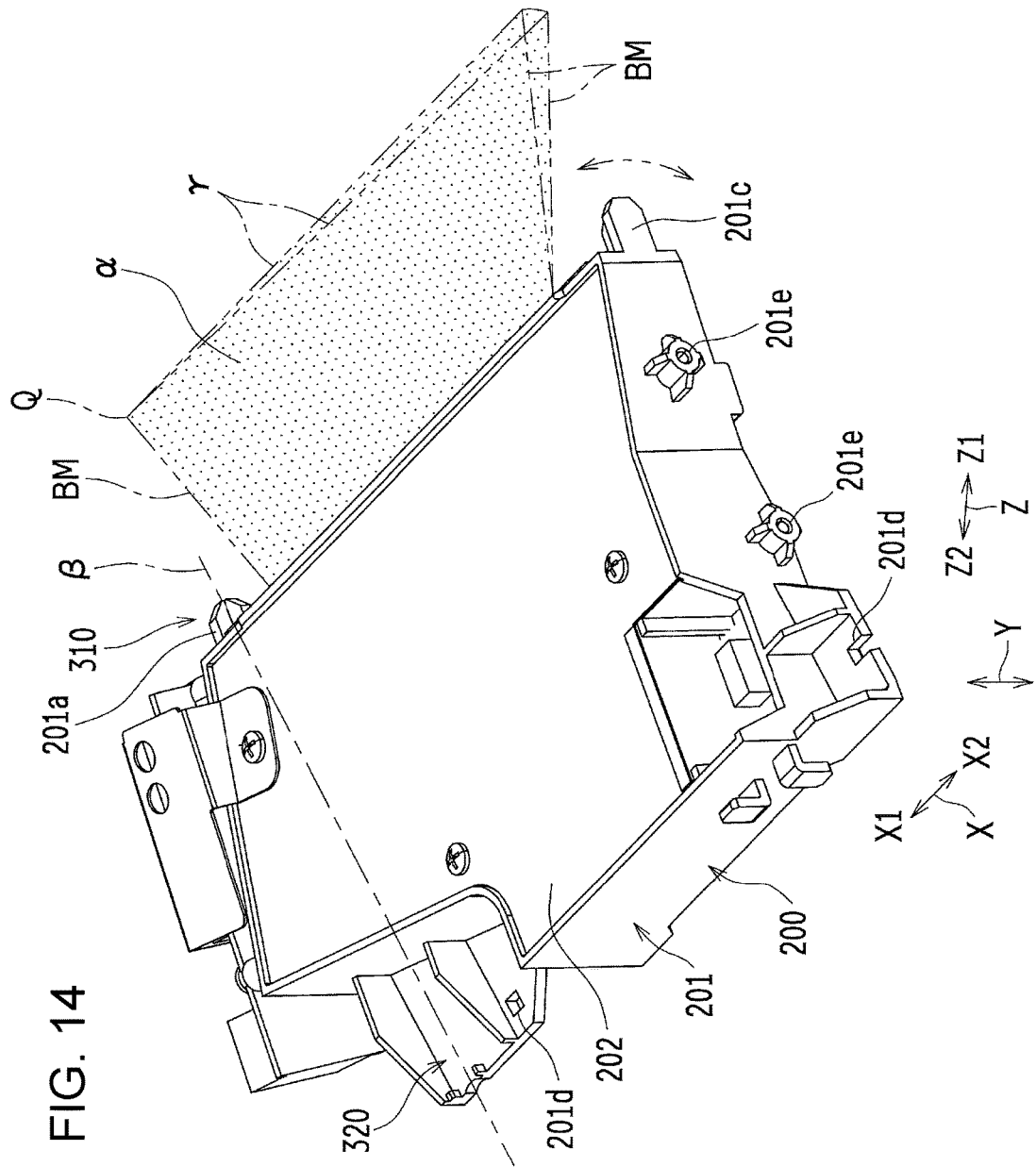
FIG. 14 is a perspective view illustrating that the optical scanning device rotates around a virtual rotation axial line.

FIG. 10 is a perspective view illustrating that a gap d is provided between the body frame 101 and the housing 201 in a second rotation fulcrum unit 320. FIG. 11 is a perspective view of toe second rotation fulcrum unit 320 as seen obliquely downward from the front surface side. FIG. 12 is a top view of the second rotation fulcrum unit 320. FIG. 13 is a perspective sectional view of an elastic member 330 in the optical scanning device 200, as seen obliquely upward from the front surface side. FIG. 14 is a perspective view illustrating that the optical scanning device 200 rotates around a virtual rotation axial line β.

The image forming apparatus 100 includes a first rotation fulcrum unit 310 and the second rotation fulcrum unit 320. The first rotation fulcrum unit 310 and the second rotation fulcrum unit 320 are provided outside on any one of sides (one side X1 in the example) in the main scanning direction X and respectively provided on the one side Z1 and on the other side Z2 in the orthogonal direction Z of the optical scanning device 200. The first rotation fulcrum unit 310 is provided outside a scanning area α of the beam BM in the main scanning direction X. The optical scanning device 200 is provided rotatably around the virtual rotation axial line β. The scanning area α is an area for irradiating the surface to be scanned F of the object to be scanned with the beam BM. The virtual rotation axial line β is a straight line connecting the first rotation fulcrum unit 310 and the second rotation fulcrum unit 320.

According to the present embodiment, the first rotation fulcrum unit 310 and the second rotation fulcrum unit 320 are provided outside on any one of the sides in the main scanning direction X and respectively provided on the one side Z1 and on the other side Z2 in the orthogonal direction Z of the optical scanning device 200. Accordingly, the virtual rotation axial line β is enabled to pass through an outside of the scanning area α of the optical scanning device 200 in the main scanning direction X. Thereby, a beam scanning trajectory γ (refer to FIG. 14) that is a scanning trajectory of the beam BM output from the optical scanning device 200 is inclined to one side with respect to the main scanning direction X with a point Q in the outside of the scanning area α as a center. Thus, the beam scanning trajectory γ is only desired to be adjusted so as to be along the main scanning direction X while the other end side of the scanning area α in the main scanning direction is being confirmed. Accordingly, it is possible to realize simplification of an adjustment operation for adjusting the beam scanning trajectory γ so as to be along the main scanning direction X.

In the present embodiment, in the housing 201 of the optical scanning device 200, the supported portion 201a is provided on the one side X1 in the main scanning direction X and also on the one side Z1 in the orthogonal direction Z. The supporting portion 101a is provided in the body frame 101 of the image forming apparatus 100. The supporting portion 101a supports the supported portion 201a rotatably around the virtual rotation axial line β. The first rotation fulcrum unit 310 is composed of a contact part between the supported portion 201a and the supporting portion 101a. Accordingly, the supported portion 201a in the housing 201 of the optical scanning device 200 is reliably supported by the supporting portion 101a in the body frame 101 of the image forming apparatus 100. Thereby, the beam scanning trajectory γ is able to be reliably adjusted so as to be along the main scanning direction X.

Specifically, the supported portion 201a protrudes toward the one side Z1 from an end of the housing 201 on the one side Z1 in the orthogonal direction Z. The supporting portion 101a is configured to have a recessed shape recessed to the one side Z1 in the orthogonal direction Z so that the supported portion 201a is able to be inserted. A dimension D1 (refer to FIG. 9A) of the supporting portion 101a in the sub scanning direction Y is set to be longer than a dimension of the supported portion 201a in the sub scanning direction Y by a predetermined distance (predetermined distance of such a degree that the supported portion 201a is able to be smoothly inserted into the supporting portion 101a). Both ends of the supported portion 201a in the sub scanning direction Y have curved parts 201a1 and 201a1 (refer to FIG. 9C) that are curved in a concave shape along the main scanning direction X. Thereby, the optical scanning device 200 is able to smoothly rotate around the virtual rotation axial line β.

In the present embodiment, a placement unit 101b on which the optical scanning device 200 is placed is provided in the body frame 101 of the image forming apparatus 100. A protrusion 101c that protrudes toward a side of the optical scanning device 200 is provided in the placement unit 101b. The second rotation fulcrum unit 320 is composed of a contact part between the protrusion 101c and a contacting portion 201b in which the protrusion 101c contacts the housing of the optical scanning device 200. Accordingly, the contacting portion 201b in the housing 201 of the optical scanning device 200 is able to be reliably contacted with the protrusion 101c in the body frame 101 of the image forming apparatus 100. Thereby, the beam scanning trajectory γ is able to be stably adjusted so as to be along the main scanning direction X.

Specifically, the gap d (refer to FIG. 10) is provided between the body frame 101 and the housing 201 in the second rotation fulcrum unit 320. Thereby, a rotation range around the virtual rotation axial line β of the optical scanning device 200 is able to be enlarged.

In the present embodiment, the protrusion 101c comes into point contact with the contacting portion 201b. Accordingly, the contacting portion 201b in the housing 201 of the optical scanning device 200 is able to be contacted with the protrusion 101c in the body frame 101 of the image forming apparatus 100 with little friction resistance. Thereby, the beam scanning trajectory γ is able to be smoothly adjusted so as to be along the main scanning direction X.

Specifically, the protrusion 101c is formed into a stick shape (cylindrical shape in this example). A tip of the protrusion 101c is formed into a hemispherical shape. Thereby, the tip of the protrusion 101c is able to come into point contact with the contacting portion. 201b. Note that, the tip of the protrusion 101c may be in an oval spherical shape, a pyramid shape, or a conical shape. The protrusion 101c may be in an elliptic cylindrical shape or a prismatic shape.

In the present embodiment, the image forming apparatus 100 further includes the elastic member 330. The elastic member 330 presses the contacting portion 201b toward the protrusion 101c. Accordingly, the elastic member 330 allows the contacting portion 201b in the housing 201 of the optical scanning device 200 to be reliably held by the protrusion 101c in the body frame 101 of the image forming apparatus 100. Thereby, the beam scanning trajectory γ is able to be further stably adjusted so as to be along the main scanning direction X.

Specifically, the elastic member 330 is a leaf spring. A through hole 331 that penetrates along a thickness direction is provided in the elastic member 330. In the body frame 101, a fixed portion 11d (female hole) is provided so that a center thereof passes through the virtual rotation axial line β. The elastic member 330 is fixed (screwed) to the fixed portion 101d when a fixing member S1 (screw) (refer to FIG. 6) passes through the through hole 331 in a state where the housing 201 is pressed toward the protrusion 101c. Thereby, the contacting portion 201b is able to be reliably pressed toward the protrusion 101c. A projection 332 that protrudes toward a side of the housing 201 is provided in a pressing portion of the elastic member 330 which presses the housing 201. This makes it possible to concentrically press the contacting portion 201b toward the protrusion 101c. In this example, the projection 332 is configured to protrude toward the side of the housing 201 by recessing a metal member having a plate shape toward the side of the housing 201.

Second Embodiment

In the present embodiment, in the housing 201 of the optical scanning device 200, the first regulated portion 201c is provided on the other side X2 in the main scanning direction X and also on toe one side Z1 in the orthogonal direction Z. The first regulating portion 101e is provided in the body frame 101 of the image forming apparatus 100. The first regulating portion 101e regulates rotation of the optical scanning device 200 around the virtual rotation axial line β by contacting the first regulated portion 201c. This makes it possible to regulate excessive rotation of the optical scanning device 200 around the virtual rotation axial line β by contact of the first regulated portion 201c and the first regulating portion 101e. Thereby, it is possible to realize simplification of the adjustment operation for adjusting the beam scanning trajectory γ.

Figure 9B:
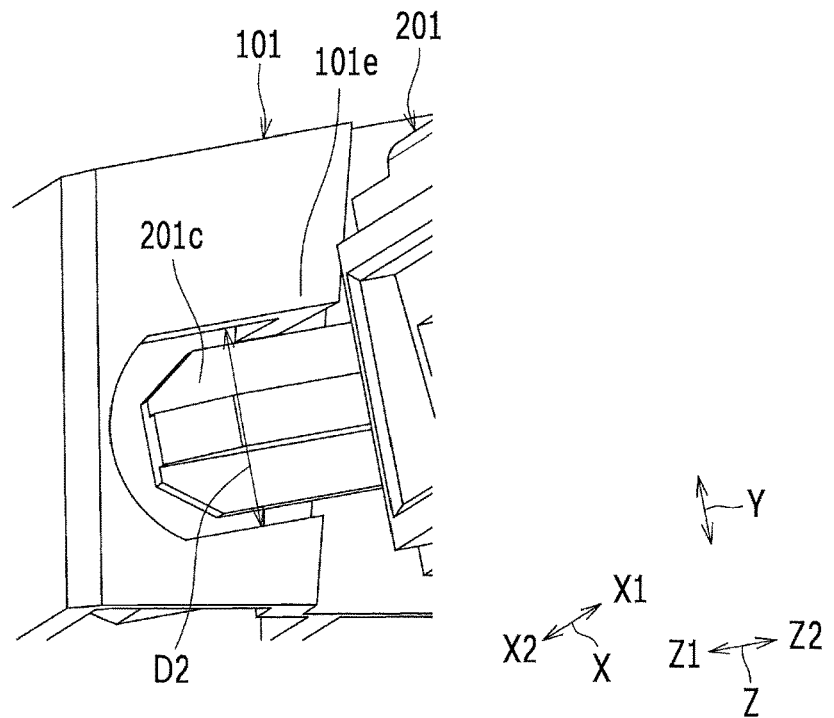
FIG. 9B is an enlarged perspective view of a part of a first regulated portion and a first regulating portion which are illustrated in FIG. 8.

Specifically, the first regulated portion 201c protrudes toward the one side Z1 from an end portion of the housing 201 on the one side Z1 in the orthogonal direction Z. The first regulating portion 101e is configured to have a recessed shape recessed to the one side Z1 in the orthogonal direction Z so that the first regulated portion 201c is able to be inserted. A dimension D2 (refer to FIG. 9B) of the first regulating portion 101e in the sub scanning direction Y is set to be longer than a dimension of the first regulated portion 201c in the sub scanning direction Y by a predetermined distance (distance of such a degree that the optical scanning device 200 is able to smoothly rotate around the virtual rotation axial line β).

Third Embodiment

Figure 15:
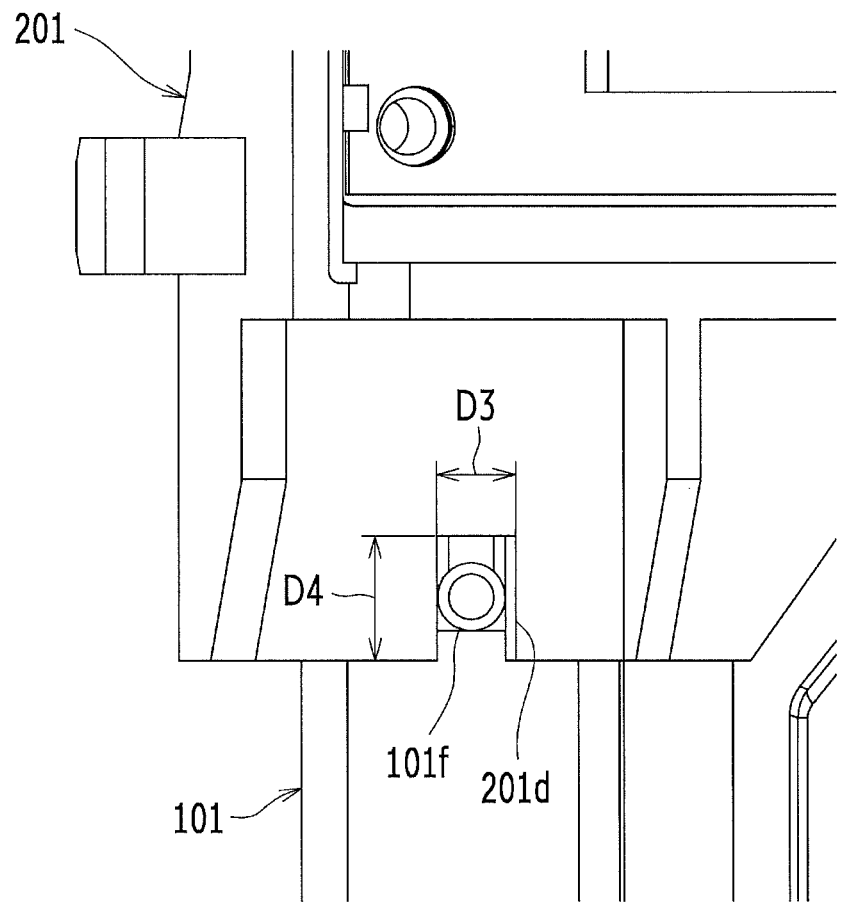
FIG. 15 is an enlarged plan view of a part of a second regulated portion and a second regulating portion which are illustrated in FIG. 5.
Figure 16:
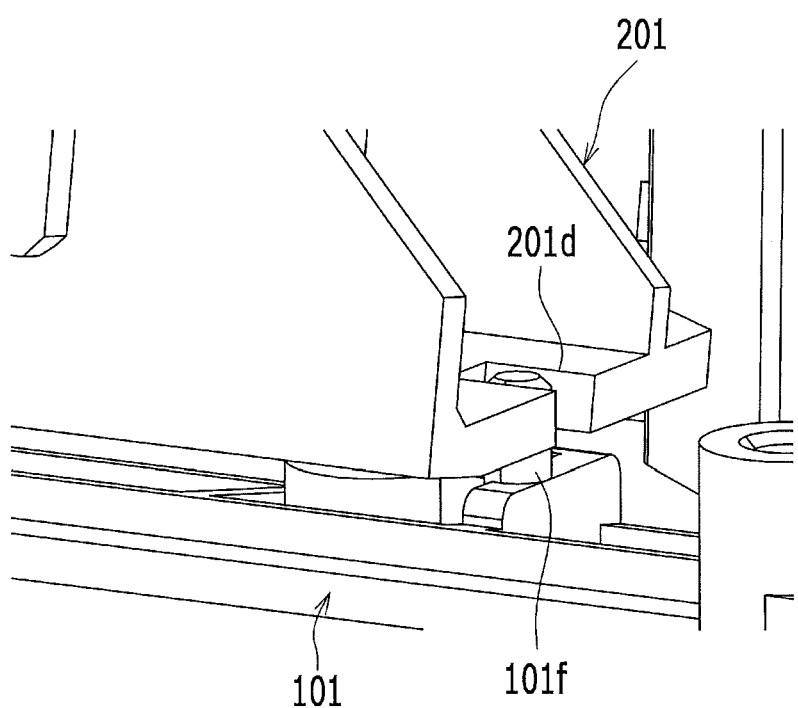
FIG. 16 is an enlarged perspective view of the part of the second regulated portion and the second regulating portion which are illustrated in FIG. 5.

FIGS. 15 and 16 are an enlarged plan view and an enlarged perspective view of a part C3 of a second regulated portion 201d and a second regulating portion 101f which are illustrated in FIG. 5, respectively. Here, the second regulated portion 201d and the second regulating portion 101f will be described below with reference to FIG. 10 through FIG. 12 in addition to FIGS. 15 and 16.

In the present embodiment, second regulated portions 201d and 201d (refer to FIG. 10 through FIG. 12 and FIGS. 15 and 16) are provided in the housing 201 of the optical scanning device 200. In the body frame 101 of the image forming apparatus 100, second regulating portions 101f and 101f (refer to FIG. 10 through FIG. 12 and FIGS. 15 and 16) are provided. The second regulating portions 101f and 101f permit rotation of the optical scanning device 200 around the virtual rotation axial line β while regulating movement of the optical scanning device 200 in the orthogonal direction Z by contacting the second regulated portions 201d and 201d. This makes it possible to regulate excessive movement of the optical scanning device 200 in the orthogonal direction Z by contact of the second regulated portions 201d and 201d and the second regulating portions 101f and 1011, in a state where the rotation of the optical scanning device 200 around the virtual rotation axial line β is permitted. Thereby, it is possible to realize simplification of the adjustment operation for adjusting the beam scanning trajectory γ.

Specifically, one second regulated portion 201d and one second regulating portion 101f are provided in the housing 201 on the one side X1 in the main scanning direction X and also on the other side Z2 in the orthogonal direction Z. The other second regulated portion 201d and the other second regulating portion 101f are provided in the housing 201 on the other side X2 in the main scanning direction X and also on the other side Z2 in the orthogonal direction Z. The second regulated portions 201d and 201d are through holes (refer to FIG. 10 through FIG. 12) that penetrate along the sub scanning direction Y or through grooves (refer to FIGS. 15 and 16). Each of the second regulated portions 201d and 201d is formed into a quadrilateral shape. Each of the second regulating portions 101f and 101, is a protrusion that protrudes toward the side of the optical scanning device 200 from the body frame 101. Each of the second regulating portions 101f and 101f is formed into a stick shape (cylindrical shape in this example). A dimension D3 (refer to FIGS. 12 and 15) of each of the second regulated portions 201d and 201d in the orthogonal direction Z is set to be longer than a dimension of each of the second regulating portions 101f and 101f in the orthogonal direction Z by a predetermined distance (predetermined distance of such a degree that the second regulating portions 101f and 101f are able to be smoothly inserted into the second regulated portions 201d and 201d, respectively). A dimension D4 (refer to FIGS. 12 and 15) of each of the second regulated portions 201d and 201d in the main scanning direction X is set to be longer than a dimension of each of the second regulating portions 101f and 101f in the main scanning direction X by a predetermined distance (distance of such a degree that the optical scanning device 200 is able to smoothly rotate around the virtual rotation axial line β). Each of the second regulating portions 101f and 101f may be in an elliptic cylindrical shape or a prismatic shape. Each of the second regulated portions 201d and 201d may be in a round shape or an elliptic shape.

Fourth Embodiment

In the main scanning direction X, the optical scanning device 200 may be held on a side (one side X1 in the example) of the first rotation fulcrum unit 310 and the second rotation fulcrum unit 320. However, in this case, positional accuracy of the optical scanning device 200 after adjustment of the beam scanning trajectory γ is easily lowered.

FIG. 17 is a perspective view of the body frame 101 of the image forming apparatus 100, as seen obliquely upward from the front surface side by the optical scanning device 200. In the present embodiment, a holding portion. 340 which holds the optical scanning device 200 on a side (the other side X2 in this example) opposite to the first rotation fulcrum unit 310 and the second rotation fulcrum unit 320 in the main scanning direction X is included. This makes it possible for the holding portion 340 to hold the optical scanning device 200 on a side opposite to the virtual rotation axial line β in the main scanning direction X. A position of the optical scanning device 200 after adjustment of the beam scanning trajectory is thereby able to be accurately maintained.

Specifically, penetrating portions (through holes or through grooves) 101g and 101g that penetrate along the main scanning direction X are provided on a front surface side of the body frame 101. Fixed portions (female holes) 201e and 201e are provided on a front surface side of the housing 201. The holding portion 340 is constituted by a corresponding one of the penetrating portions 101g and 101g and a corresponding one of the fixed portions 201e and 201e. In the optical scanning device 200, fixing members (screws) S2 and S2 respectively pass through the penetrating portions 101g and 101g and are respectively fixed (screwed) to the fixed portions 201e and 201e in a state where the beam scanning trajectory γ is adjusted. This makes it possible to hold the optical scanning device 200 on the side opposite to the virtual rotation axial line β in the main scanning direction X.

Usually, it is difficult to ensure an operation space where the adjustment operation for adjusting the beam scanning trajectory γ is performed, except for a place on the front surface side (a side of the operation panel 104, a side of the open/close cover 105, a drawing-out side of the sheet feeding tray 81) of the image forming apparatus 100. Accordingly, it is difficult to perform the adjustment operation for adjusting the beam scanning trajectory γ.

In this respect, in the present embodiment, the optical scanning device 200 is configured so that a position of the optical scanning device 200 is adjustable from the front surface side of the image forming apparatus 100. Accordingly, an operator is enabled to adjust the position of the optical scanning device 200 from the front surface side of the image forming apparatus 100. Thereby, it is possible to realize simplification of the adjustment operation for adjusting the beam scanning trajectory γ.

Specifically, the operator loosens the fixing members (screws) S2 and S2 from the front surface side by using a jig to thereby adjust the beam scanning trajectory γ while moving the optical scanning device 200 up or down with the fixing members S2 and S2. Then, the operator temporarily fixes the optical scanning device 200 with the fixing members S2 and S2. Such an operation is repeated until the beam scanning trajectory γ is aligned with the main scanning direction X. The operator securely fixes the optical scanning device 200 with the fixing members S2 and S2 after the beam scanning trajectory γ is aligned with the main scanning direction X.

Another Embodiment

In the present embodiment, the virtual rotation axial line β is provided on the one side X1 in the main scanning direction X, but may be provided on the other side X2.

The disclosure is not limited to any of the embodiments described above and is able to be implemented in other various forms. Any of the embodiments is merely an example in all respects and should not be construed as limitative. The scope of the disclosure is indicated by the scope of the claims and is not restricted in any way by the text of the specification. Moreover, all variations and modifications falling within a scope equivalent to the scope of the claims are included in the scope of the disclosure.

The present disclosure contains subject matter related to that disclosed in Japanese Priority Patent Application JP 2018-000649 filed in the Japan Patent Office on Jan. 5, 2018, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:
1. An image forming apparatus including an optical scanning device that scans an object to be scanned with a beam in a main scanning direction, the image forming apparatus comprising
 a first rotation fulcrum unit and a second rotation fulcrum unit that are respectively provided in the optical scanning device on one side and on the other side in an orthogonal direction orthogonal to the main scanning direction, wherein
 the first rotation fulcrum unit is provided outside a scanning area of the beam in the main scanning direction, and
 the optical scanning device is provided rotatably around a virtual rotation axial line connecting the first rotation fulcrum unit and the second rotation fulcrum unit.
2. The image forming apparatus according to claim 1, wherein
 a supported portion is provided on the one side in a housing of the optical scanning device,
 a supporting portion that supports the supported portion rotatably around the virtual rotation axial line is provided in a body frame of the image forming apparatus, and the first rotation fulcrum unit is composed of the supported portion and the supporting portion.

3. The image forming apparatus according to claim 1, wherein
a placement unit on which the optical scanning device is placed is provided in a body frame of the image forming apparatus,
a protrusion that protrudes toward a side of the optical scanning device is provided in the placement unit, and
the second rotation fulcrum unit is composed of the protrusion and a contacting portion at which the protrusion contacts a housing of the optical scanning device.

4. The image forming apparatus according to claim wherein
the protrusion comes into point contact with the contacting portion.

5. The image forming apparatus according to claim 3, further comprising
an elastic member that presses the contacting portion toward the protrusion.

6. The image forming apparatus according to claim 1, wherein
a first regulated portion is provided on the other side in the main scanning direction in a housing of the optical scanning device, and
a first regulating portion that regulates rotation of the optical scanning device around the virtual rotation axial line by contacting the first regulated portion is provided in a body frame of the image forming apparatus.

7. The image forming apparatus according to claim 1, wherein
a second regulated portion is provided in a housing of the optical scanning device, and
a second regulating portion that permits rotation of the optical scanning device around the virtual rotation axial line while regulating movement of the optical scanning device in the orthogonal direction by contacting the second regulated portion is provided in a body frame of the image forming apparatus.

8. The image forming apparatus according to claim 1, further comprising
a holding portion that holds the optical scanning device on a side opposite to the first rotation fulcrum unit and the second rotation fulcrum unit in the main scanning direction.

9. The image forming apparatus according to claim 1, wherein
the optical scanning device is configured so that a position of the optical scanning device is adjustable from front surface side of the image forming apparatus.

* * * * *